United States Patent
Ono et al.

(10) Patent No.: US 7,488,258 B2
(45) Date of Patent: Feb. 10, 2009

(54) UNIVERSAL JOINT BOOT

(75) Inventors: Shigeyuki Ono, Kikukawa (JP); Takashi Shimazu, Fujisawa (JP)

(73) Assignee: NOK Corporation, Tokyo (JP)

( * ) Notice: Subject to any disclaimer, the term of this patent is extended or adjusted under 35 U.S.C. 154(b) by 284 days.

(21) Appl. No.: 10/572,684

(22) PCT Filed: Sep. 16, 2004

(86) PCT No.: PCT/JP2004/013517

§ 371 (c)(1),
(2), (4) Date: Mar. 20, 2006

(87) PCT Pub. No.: WO2005/028897

PCT Pub. Date: Mar. 31, 2005

(65) Prior Publication Data

US 2007/0129155 A1    Jun. 7, 2007

(30) Foreign Application Priority Data

Sep. 19, 2003    (JP) .............................. 2003-327955

(51) Int. Cl.
*F16D 3/84* (2006.01)
(52) U.S. Cl. ...................................... 464/175; 277/647
(58) Field of Classification Search ......... 464/173–175; 277/634–637, 647; 411/512
See application file for complete search history.

(56) References Cited

U.S. PATENT DOCUMENTS 2,832,223 A  *  4/1958  Couraud ................. 277/647 X
3,801,111 A  *  4/1974  Messenger .............. 464/173 X
4,664,393 A  *  5/1987  Hazebrook .............. 464/173 X
4,832,161 A  *  5/1989  Weiler et al. ............ 277/636 X
5,836,824 A    11/1998  Konegen et al. ............ 464/175
6,402,999 B1    6/2002  Sadr et al. ..................... 264/68

FOREIGN PATENT DOCUMENTS

| JP | 60-64362 | 5/1985 |
| JP | 2-98221 | 8/1990 |
| JP | 4-116022 | 10/1992 |

* cited by examiner

*Primary Examiner*—Greg Binda
(74) *Attorney, Agent, or Firm*—Jacobson Holman PLLC

(57) ABSTRACT

A universal joint boot having a boot body including a bellows part and an opening portion which is formed in one end of the bellows part and into which a case for receiving one member of two members moving relatively to each other is inserted. An annular adaptor is mounted on the inner peripheral surface of the opening portion and has an outer peripheral surface formed nearly in the same shape as the inner peripheral surface. The adaptor has a fixing portion that is pressed by the inner peripheral surface of the opening portion of the boot body, thereby being fixed to the case. A reversing portion is located opposite to the fixing portion with the opening portion between them and sandwiches the opening portion together with the fixing portion. A folding portion is located where the reversing portion is folded back to the outside. Hence, the universal joint boot can be easily assembled.

4 Claims, 8 Drawing Sheets

UNIVERSAL JOINT BOOT

This is a nationalization of PCT/JP2004/013517 filed 16 Sep. 2004 and published in Japanese.

TECHNICAL FIELD

The present invention relates to a boot for protecting a movable mechanism and, in particular, to a universal joint boot for protecting the movable mechanism of a universal joint in automobiles and industrial machines.

BACKGROUND ART

Among conventional boots of this kind is a boot that includes a freely extendable and contractible bellows part, a large-diameter annular mounting part formed at one end in the axial direction of this bellows part, and a small-diameter annular mounting part formed at the other end in the axial direction, and is molded by blowing material such as thermoplastic elastomer.

In the boot of this kind, the large-diameter side mounting part is fixedly fastened by one clamp to the outer peripheral surface of an end portion of one shaft of two members that can move relatively to each other and the small-diameter side mounting part is fixedly fastened by another clamp to the outer peripheral surface of the other shaft.

With this, the bellows part can be flexibly deformed with the relative movement of the two members to prevent foreign matters from entering a movable mechanism between the two members from the outside and to prevent lubricating grease or the like filled in the movable mechanism from leaking to the outside.

As for the boot described above, there has been known a boot that is used for protecting a constant-velocity joint used for transmitting a driving force in an automobile. Further, there is a case where the outer peripheral shape of the fixed part of a joint cup having the boot mounted thereon is not cylindrical but may be formed in the shape of a deformed cylinder that has three curved depressions, so-called tripod. In this case, in the conventional boot, the inner periphery of the fixing part of the boot is formed in the shape of a tripod according to the shape of the outer periphery of the fixing part of the cup and the outer periphery of the fixing part of the boot is formed in a cylindrical shape. The outer periphery of the fixing part of the boot is fastened by a band, whereby the boot is fixed to the cup.

Further, a construction has been proposed in which, when both of the boot and the cup are made of hard materials, an adaptor member made of rubber or elastic plastic that is soft and can be easily deformed is interposed between the boot and the cup so as to eliminate the gap between the respective members at the fixing part (see for example, U.S. Pat. No. 6,402,999). To be specific, as shown in FIG. 10, to mount a boot 101 on a case (not shown) formed in the shape of a tripod, an adaptor member 110 having a circular outer peripheral surface 111 and an inner peripheral surface 113 having convex portions 112 corresponding to the shape of a tripod of the outer periphery of the fixing part of the case is made separately from the boot 101 main body. Then, the adaptor 110 is fitted in the boot 101 and is further mounted on the case to cover and protect the movable mechanism of a constant-velocity joint.

Further, a construction has been proposed in which an annular rubber bush 130 is mounted on the opening end edge 122 of a hollow cylindrical boot body 128 made of synthetic resin as a dust preventing boot of constant-velocity joint (see, for example, Japanese published unexamined utility model application No. 60-64362). The rubber bush 130 is formed in the shape of a letter C in section and the opening end edge 122 is closely fitted in the center depressed groove 132. The rubber bush 130 is pressed onto the outer peripheral surface 116 of the case by a fastening band 134 mounted on the outer peripheral surface of the rubber bush 130. Here, FIG. 11A is a sectional view of a dust preventing boot 126 and FIG. 11B is an enlarged sectional view of a portion enclosed by a dotted line in FIG. 11A.

DISCLOSURE OF THE INVENTION

Problems to be Solved by the Invention

However, the related art described above presents the following problems.

That is, the boot body and the adaptor are made separately and then are assembled together, which presents a problem of productivity. In particular, in recent years, when light resin is used for the material of a boot so as to reduce the weight of a tripod type constant-velocity joint, there is also presented a problem that the boot resists being deformed and hence can not be put into close contact with an adaptor.

The present invention has been made to solve the problems of the related art described above. The object of the invention is to provide a universal joint boot that can be easily assembled.

Means for Solving the Problems

To achieve above-mentioned object, the present invention provides a universal joint boot comprising:

a boot body including a cylindrical bellows part that has valleys and peaks formed continuously in a repetitive manner and can extend and contract and an opening portion which is formed in one end of the bellows part and into which a case for receiving one member of two members moving relatively to each other is inserted.

An annular adaptor is mounted on an inner peripheral surface of the opening portion and has an outer peripheral surface formed nearly in the same shape as the inner peripheral surface.

The adaptor has:

a fixing portion that is pressed by the inner peripheral surface of the opening portion of the boot body, thereby being fixed to the case;

a reversing portion that is located opposite to the fixing portion with the opening portion between them and sandwiches the opening portion together with the fixing portion; and a folding portion where the reversing portion is folded back outside.

According to this construction, the adaptor is mounted on the boot body and then can sandwich the opening portion of the boot body, so that even if the boot body is made of material that resists being deformed, the boot body can be easily assembled.

Further, the universal joint boot is characterized in that the reversing portion has a protruding portion for pressing the outer peripheral portion of the opening portion inwardly.

According to this construction, the adaptor can sandwich the boot body more securely and hence can enhance sealing ability.

Further, the universal joint boot is characterized in that the outer periphery of the fixing portion has an uneven surface in contact with the inner periphery of the boot body.

According to this construction, the boot body resists being removed from the adaptor.

Still further, the universal joint boot is characterized in that a cutout is formed from the reversing portion to the folding portion.

According to this construction, even if the adaptor is hard, the reversing portion can be easily folded back and hence can enhance ease with which the boot is assembled.

Still further, the universal joint boot is characterized in that the reversing portion has a mounting portion on which a band is mounted in a state where the reversing portion is folded back from the folding portion.

According to this construction, it is possible to seal not only the fixing portion and the boot body but also the boot body and the reversing portion and hence to enhance sealing ability.

Advantageous Effect of the Invention

According to the invention, it is possible to provide a universal joint boot that can be easily assembled.

BEST MODE FOR CARRYING OUT THE INVENTION

Hereafter, the best mode for carrying out this invention will be described in detail by way of example with reference to the drawings and embodiments. However, as for the size, material, shape, and relative arrangement of constituent parts described in these embodiments, it is not intended to limit the scope of this invention only to these unless otherwise specified. Further, the materials and shapes of members once described in the following description are the same as those described in the beginning unless otherwise specified.

Figure 2:
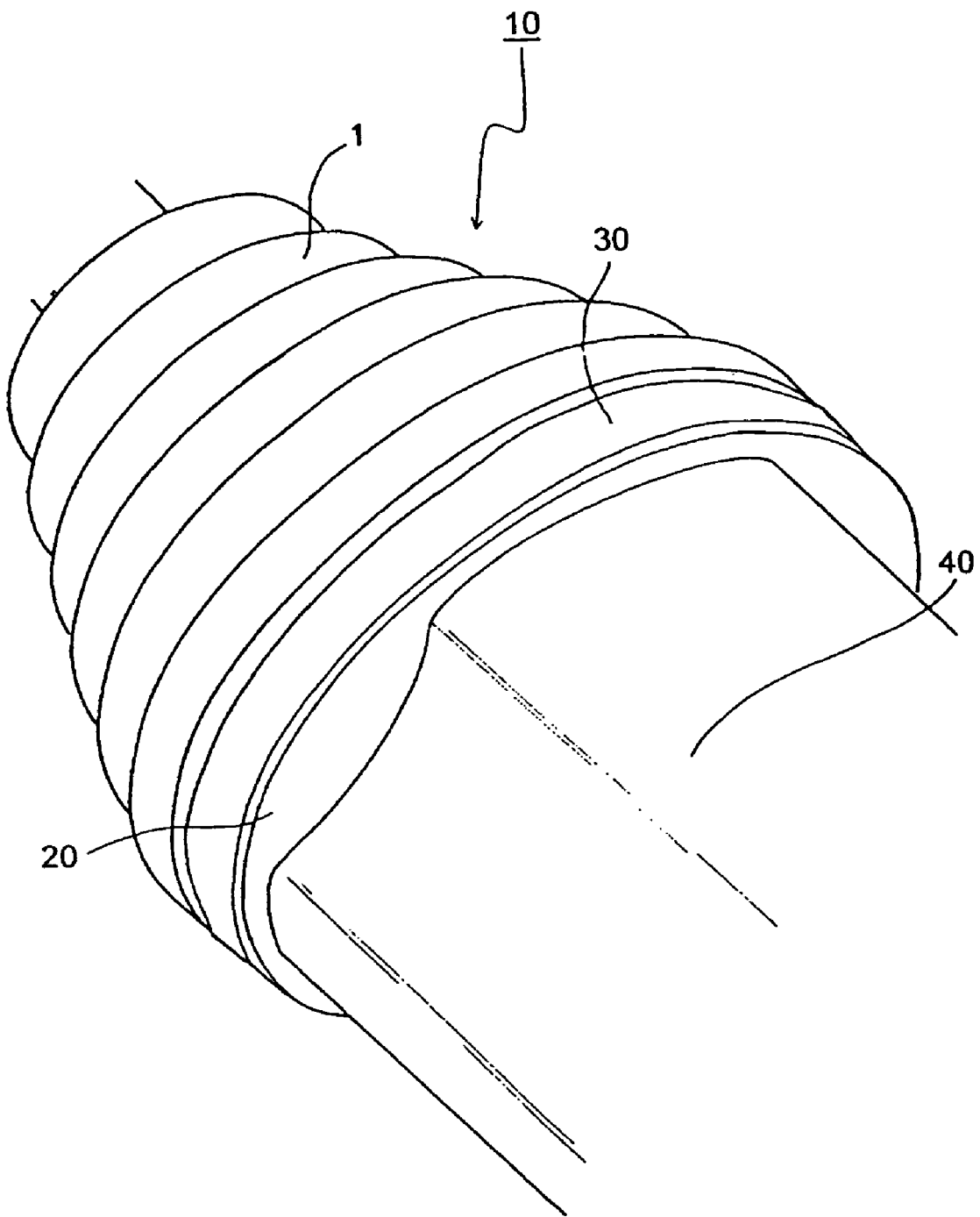
FIG. 2 is an external perspective view showing a state where a boot according to this embodiment is mounted on a case.

First, a universal joint boot according to this embodiment will be described with reference to FIG. 2. FIG. 2 is an external perspective view showing a state where a boot according to this embodiment is mounted on a case.

A universal joint boot 10 used for a constant-velocity universal joint according to this embodiment has a boot body 1 and an annular adaptor 20 mounted on the boot body 1. The boot body 1 has a cylindrical bellows part that has peaks and valleys formed continuously in a repetitive manner and can extend and contract and an opening portion 2 which is formed at one end of the bellows part and into which a case for receiving one member of two members moving relatively to each other is inserted. Further, the annular adaptor 20 is mounted on the inner peripheral surface of the opening portion 2 of the boot body 1 and has an outer peripheral surface formed in the same shape as the inner peripheral surface. That is, the universal joint boot 10 is fitted on the outer periphery of the opening portion of a joint cup (case) 40 that receives the shaft part of one of the two members capable of moving relatively to each other and is fixed to the cup 40 by a band 30 in a state where the adaptor 20 is mounted on the boot body 1.

EMBODIMENT 1

Figure 1:
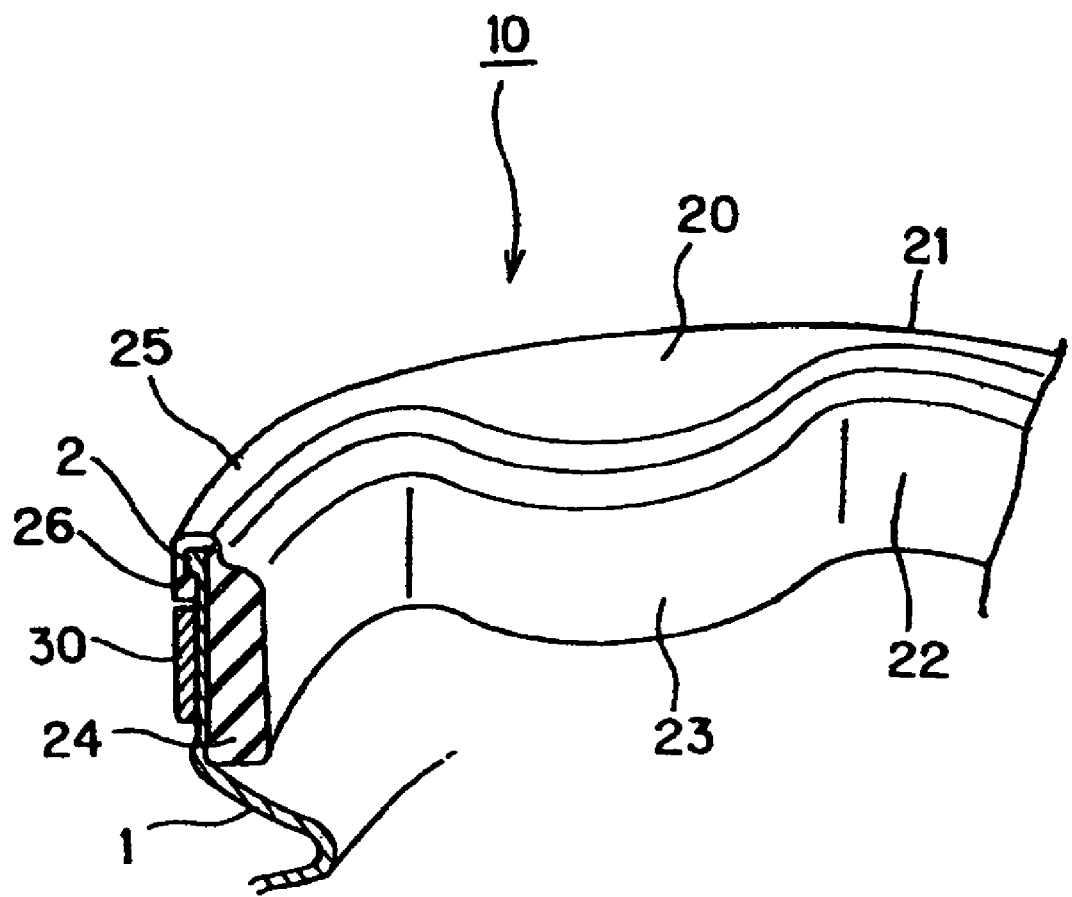
FIG. 1 is a schematic construction view of a universal joint boot according to embodiment 1.
Figure 3:
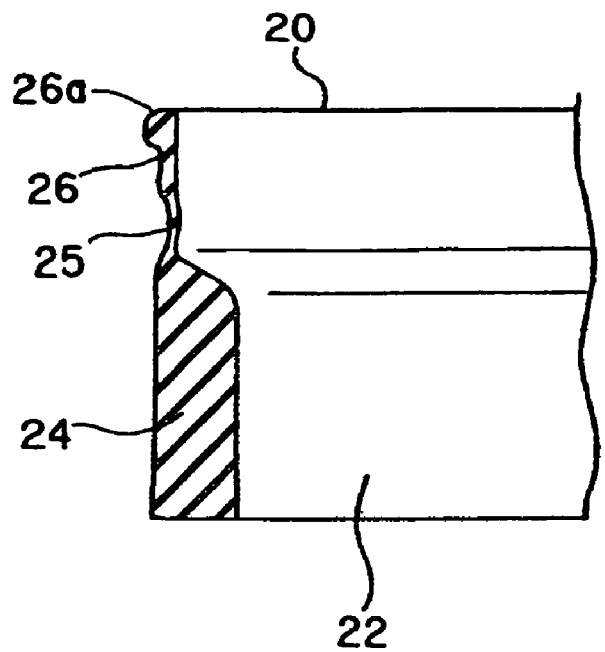
FIG. 3 is a half-sectional view of an adaptor according to embodiment 1.

FIG. 1 is a schematic construction view of a universal joint boot according to embodiment 1 and FIG. 3 is a half-sectional view of an adaptor according to the embodiment 1.

As shown in FIGS. 1 and 3, the adaptor 20 is an annular member having an outer peripheral surface 21 formed in a circular shape and an inner peripheral surface 22 formed in the shape of a variant (tripod) having three curved protrusions 23. Here, the adaptor 20 according to this embodiment is formed of rubber or elastic plastic. More preferably, it is recommendable to select rubber or synthetic resin suitable for molding.

The adaptor 20 is first manufactured as a hollow cylindrical member, for example, by molding (see FIG. 3). The adaptor 20 as the cylindrical member has a fixing portion 24 fixed to the boot body 1 by the band 30, a folding portion 25 having a thinner thickness than the fixing part 24 so as to be easily folded back, and a reversing portion 26 that is folded back and then sandwiches one opening portion 2 of the boot body 1.

Next, the adaptor 20 is inserted to a predetermined position from the one opening portion 2 of the boot body 1 and then the folding portion 25 is folded back to the outside so as to sandwich the opening portion 2. With this, the boot body 1 is securely sandwiched by the adaptor 20 to enhance sealing ability. Further, because the adaptor 20 is mounted on the boot body 1 and then sandwiches the opening portion 2 of the boot body 1, even if the boot body 1 is made of material that resists being deformed, the boot body 1 can be easily assembled.

Further, the reversing portion 26 has a protruding portion 26a so as to press the outer peripheral surface of the edge of the opening portion 2. The protruding portion 26a is formed so as to protrude toward the inside of the adaptor 20 in a state where the reversing portion 26 is folded back at the folding portion 25. With this, the adaptor 20 can sandwich the boot body 1 more securely and hence can enhance sealing ability.

Figure 4:
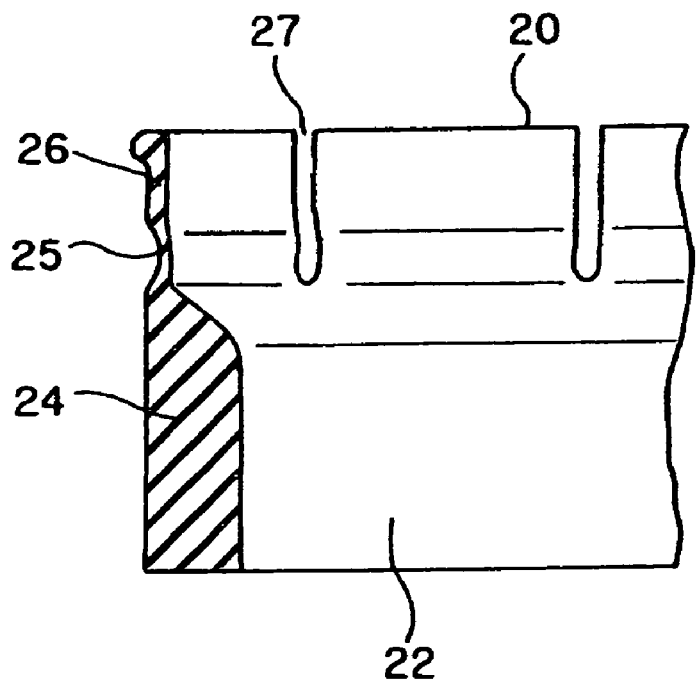
FIG. 4 is a half-sectional view of the adaptor according to embodiment 1.

Still further, when the adaptor 20 is made of material that is so hard that resists being deformed, cutouts 27 may be formed from the reversing portion 26 to the folding portion 25 (see FIG. 4). With this, even if the adaptor 20 is hard, the reversing portion 26 is easily folded back to enhance ease with which the boot body 1 is assembled. Here, the number of cutouts 27 can be selected as appropriate by the material, size, and thickness of the adaptor 20 and the cutouts 27 are preferably formed at equal intervals. With this, the adaptor 20 can sandwich the opening portion 2 of the boot body 1 uniformly in a state where the reversing portion 26 is folded back.

Figure 5:
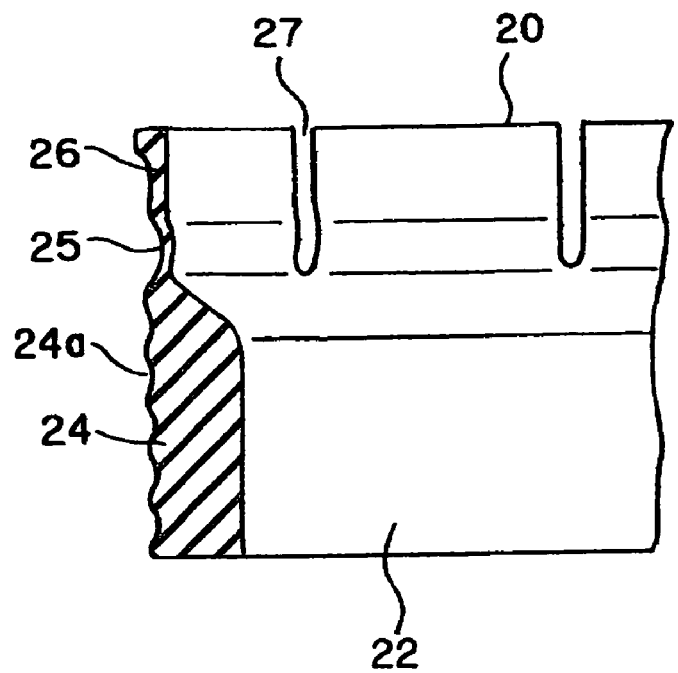
FIG. 5 is a half-sectional view of the adaptor according to embodiment 1.

Still further, an uneven surface 24a may be formed on the outer periphery of the fixing portion 24 (see FIG. 5). With this, the boot body 1 becomes resistant to being removed from the adaptor 20 and is securely fixed to the cup 40 by the band 30.

EMBODIMENT 2

Figure 6:
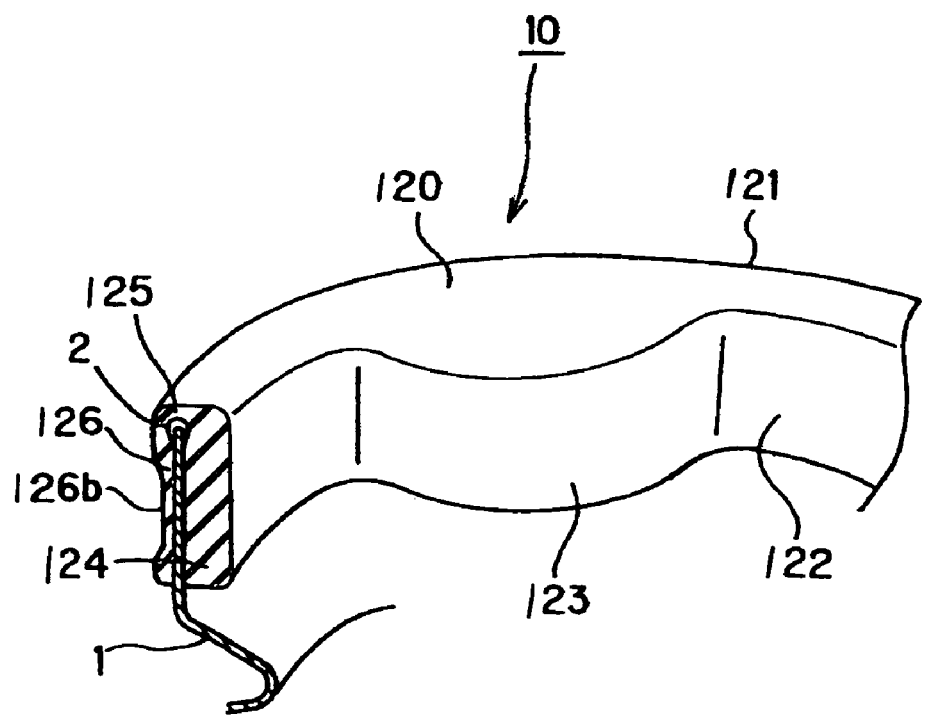
FIG. 6 is a schematic construction view of a universal joint boot according to embodiment 2.
Figure 7:
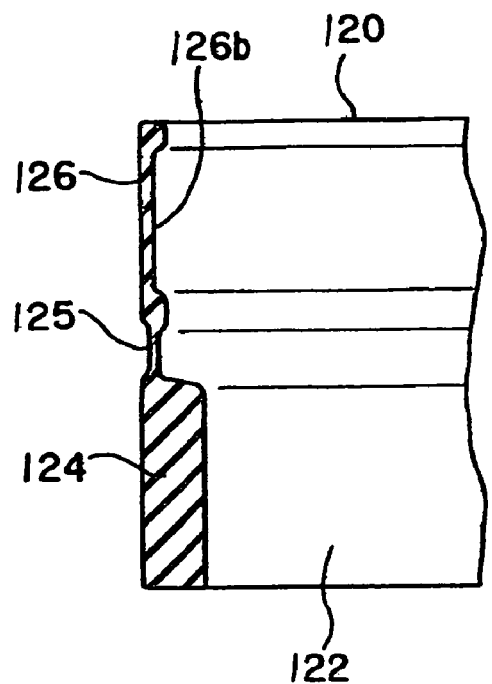
FIG. 7 is a half-sectional view of an adaptor according to embodiment 2.

FIG. 6 is a schematic construction view of a universal joint boot according to embodiment 2 and FIG. 7 is a half-sectional view of an adaptor according to embodiment 2. Here, the description of construction different from that of the embodiment 1 described above will be mainly provided below and the description of the other construction will omitted as appropriate.

The adaptor 120 according to the embodiment 2 has the fixing portion 124 fixed to the boot body 1 by the band 30, the folding portion 125 having a thinner thickness than the fixing part 124 so as to be easily folded back, and the reversing portion 126 that is folded back and then sandwiches one opening portion 2 of the boot body 1.

Here, the reversing portion 126 is extended to a position opposite to the outer periphery of the fixing portion 124 in a state where it is folded back from the folding portion 125. The reversing portion 126 has a mounting portion 126b where the band 30 is mounted. The mounting portion 126b is formed on the outer periphery of the reversing portion 126 in a state where the reversing portion 126 is folded back at the folding portion 125. Further, the mounting portion 126b, a portion of the reversing portion 126, is depressed along the entire periphery so that the band 30 is not shifted in a mounting position.

As described above, the opening portion 2 of the boot body 1 is sandwiched by the fixing portion 124 and the reversing portion 126 and then the band 30 is mounted on the mounting portion 126b to seal not only the fixing portion 124 and the boot but also the boot body 1 and the reversing portion 126, which can further enhance sealing ability.

Figure 8:
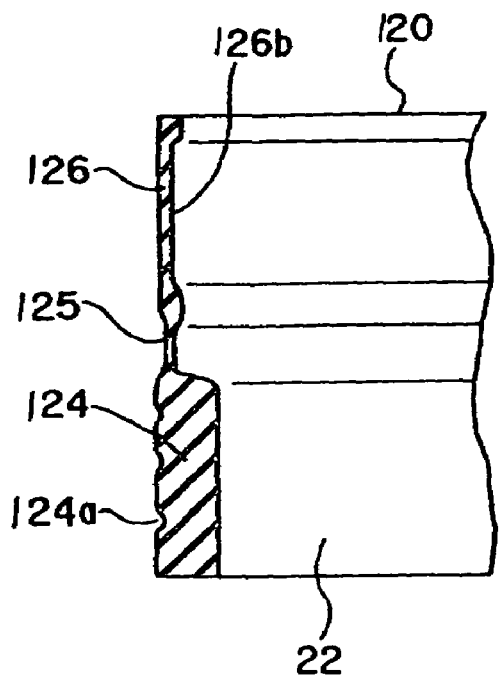
FIG. 8 is a half-sectional view of the adaptor according to embodiment 2.

Further, an uneven surface may be formed on the outer periphery of the fixing portion 124 (see FIG. 8). With this, the boot body 1 becomes resistant to being removed from the adaptor 120 and hence the boot body 1 is securely fixed to the cup 40 by the band 30.

Figure 9:
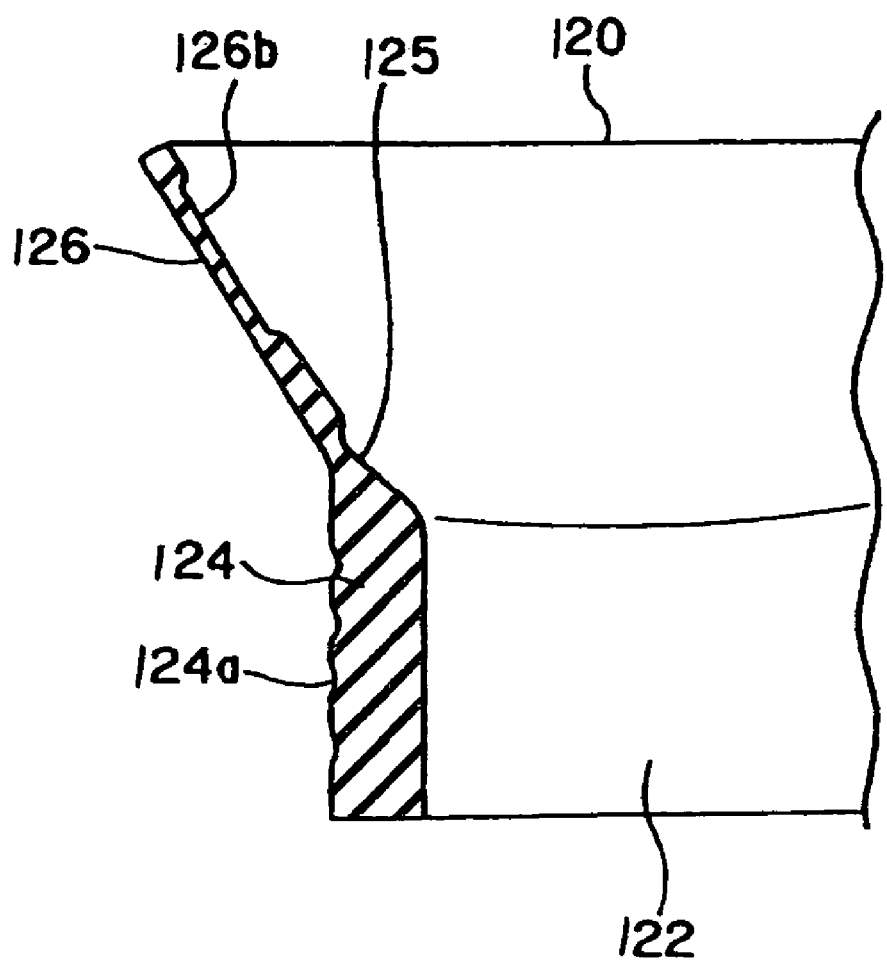
FIG. 9 is a half-sectional view of the adaptor according to embodiment 2.
Figure 10:
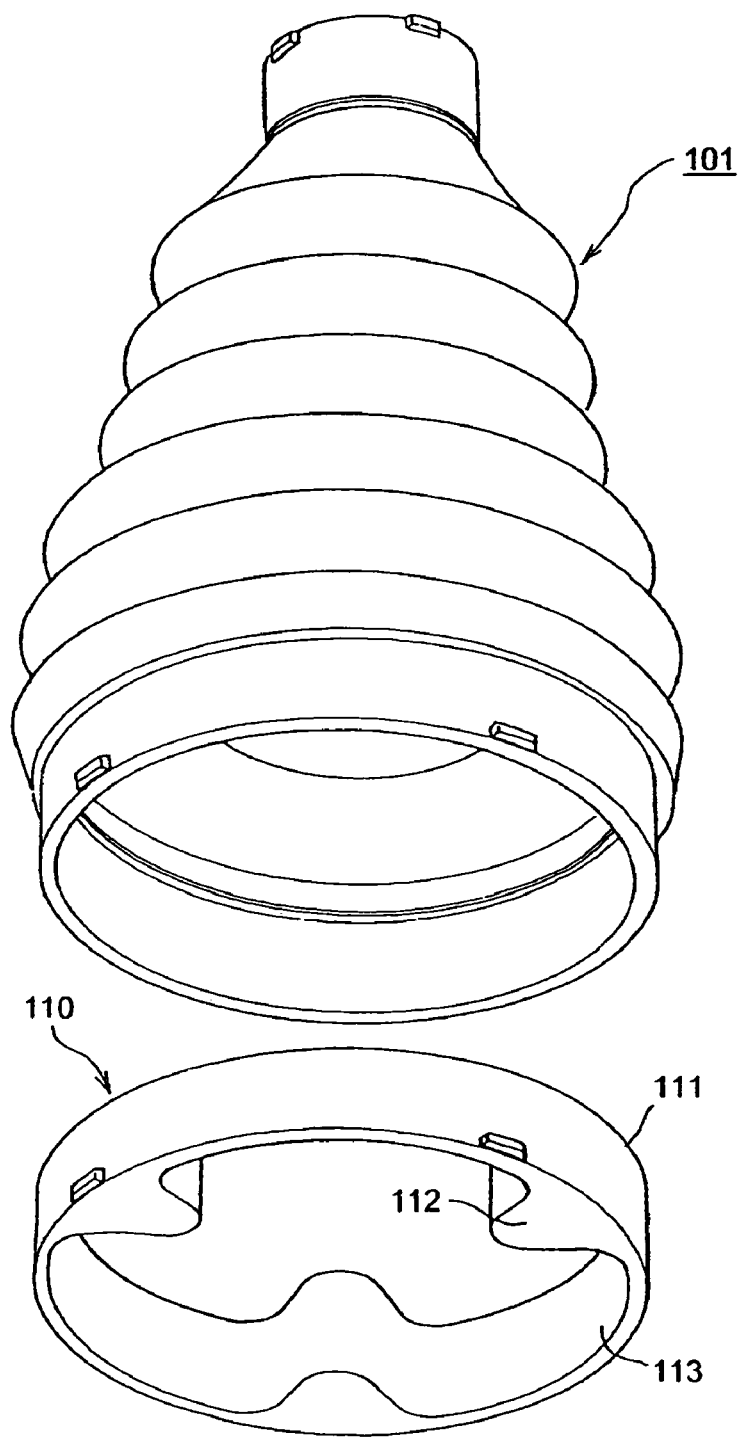
FIG. 10 is an external perspective view of a boot for protecting a constant-velocity joint in the related art.
Figure 11A:
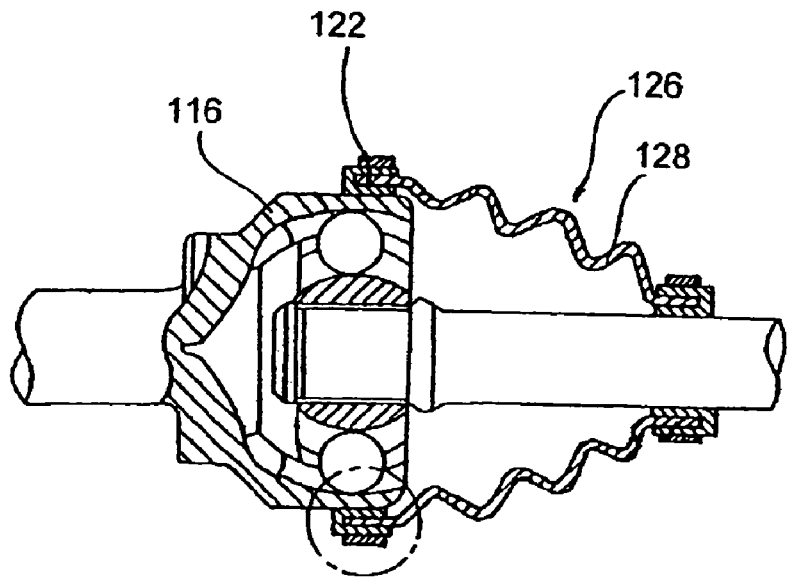
FIG. 11 is a sectional view of a dust-protecting boot in the related art.
Figure 11B:
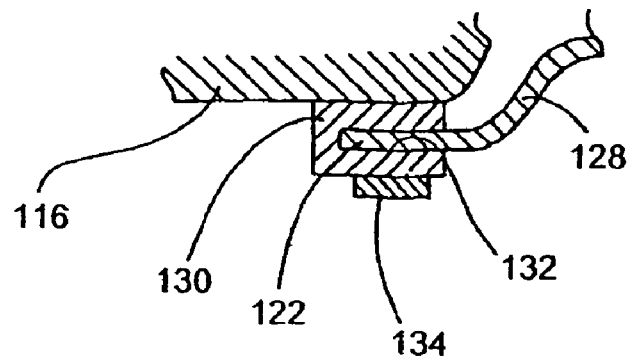

Still further, when the adaptor 20 is manufactured, the reversing portion 126 does not necessarily need to be straight with respect to the fixing portion but, as shown in FIG. 9, may be gradually increased in inside diameter toward the tip of the reversing portion 126. With this, the reversing portion 126 can be easily folded back and hence it is possible to provide a universal joint boot that can be easily assembled.

The invention claimed is:

1. A universal joint boot comprising:
   a boot body including a cylindrical bellows part having valleys and peaks formed continuously in a repetitive manner for extension and contraction and an opening portion formed in one end of the bellows part; and
   an annular adaptor mounted on an inner peripheral surface of the opening portion and having an outer peripheral surface formed nearly in a same shape as the inner peripheral surface,
   the adaptor being rubber or elastic plastic having:
   a fixing portion pressed by the inner peripheral surface of the opening portion of the boot body;
   a reversing portion located opposite to the fixing portion with the opening portion being located between the fixing portion and the reversing portion and sandwiching the opening portion together with the fixing portion; and
   a folding portion located between the reversing portion and the fixing portion,
   the reversing portion and the folding portion being thinner than the fixing portion to facilitate folding over of the reversing portion at the folding portion.

2. The universal joint boot according to claim 1, wherein that the reversing portion has a protruding portion for pressing an outer peripheral portion of the opening portion inwardly.

3. The universal joint boot according to claim 1, wherein that an outer periphery of the fixing portion has an uneven surface in contact with an inner periphery of the boot body.

4. The universal joint boot according to claim 1, wherein the reversing portion has a mounting portion on which a band is mounted in a state where the reversing portion is folded from the folding portion.

* * * * *